(12) United States Patent
Shelest et al.

(10) Patent No.: US 7,591,010 B2
(45) Date of Patent: Sep. 15, 2009

(54) METHOD AND SYSTEM FOR SEPARATING RULES OF A SECURITY POLICY FROM DETECTION CRITERIA

(75) Inventors: Art Shelest, Sammamish, WA (US); Scott A. Field, Redmond, WA (US); Subhashini Raghunathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 11/039,637

(22) Filed: Jan. 19, 2005

(65) Prior Publication Data

US 2006/0161965 A1 Jul. 20, 2006

(51) Int. Cl.
*G06F 9/00* (2006.01)
*G06F 15/16* (2006.01)
*G06F 17/00* (2006.01)

(52) U.S. Cl. .................................... 726/13; 709/223
(58) Field of Classification Search ................ 713/201; 726/13
See application file for complete search history.

(56) References Cited

U.S. PATENT DOCUMENTS

| | | | | |
|---|---|---|---|---|
| 3,676,000 A | * | 7/1972 | Mayer, Jr et al. | 355/52 |
| 5,195,133 A | * | 3/1993 | Kapp et al. | 705/75 |
| 5,361,359 A | | 11/1994 | Tajalli et al. | |
| 5,915,085 A | | 6/1999 | Koved | |
| 5,950,195 A | | 9/1999 | Stockwell et al. | |
| 5,987,611 A | | 11/1999 | Freund | |
| 6,131,163 A | | 10/2000 | Wiegel | |
| 6,157,931 A | * | 12/2000 | Cane et al. | 707/204 |
| 6,405,212 B1 | | 6/2002 | Samu et al. | |
| 6,412,070 B1 | | 6/2002 | Van Dyke et al. | |
| 6,484,261 B1 | | 11/2002 | Wiegel | |
| 6,631,200 B1 | * | 10/2003 | Savoray et al. | 382/119 |
| 6,678,827 B1 | | 1/2004 | Rothermel et al. | |
| 6,986,051 B2 | * | 1/2006 | Le Pennec et al. | 713/188 |
| 7,032,244 B2 | * | 4/2006 | Wilkes | 726/23 |
| 7,039,948 B2 | | 5/2006 | Harrah et al. | |
| 7,085,928 B1 | | 8/2006 | Schmid et al. | |
| 7,152,242 B2 | * | 12/2006 | Douglas | 726/23 |
| 7,213,146 B2 | | 5/2007 | Stehlin | |
| 7,328,451 B2 | | 2/2008 | Aaron | |

(Continued)

OTHER PUBLICATIONS

U.S. Appl. No. 11/150,819, filed Jun. 9, 2005, Shelest et al.

(Continued)

*Primary Examiner*—Kambiz Zand
*Assistant Examiner*—Dant B Shaifer Harriman
(74) *Attorney, Agent, or Firm*—Perkins Coie LLP

(57) ABSTRACT

A method and system that enables a security policy to separate developer-provided detection criteria from an administrator-provided custom policy is provided. The security system allows a developer of detection criteria to provide a signature file containing the signatures that are available for use by a security policy. The security system also allows an administrator of a computer system to specify a custom policy that uses the signatures of the signature file. The developer may distribute the signature file to host computer systems independently of the administrator's distribution of the rules of the custom policy to the host computer systems. When a security enforcement event occurs at the host computer system, the security system applies the rules of the security policy to the event.

20 Claims, 6 Drawing Sheets

U.S. PATENT DOCUMENTS

| | | | |
|---|---|---|---|
| 7,373,659 | B1 | 5/2008 | Vignoles et al. |
| 7,380,267 | B2 | 5/2008 | Arai et al. |
| 2002/0123966 | A1 | 9/2002 | Chu et al. |
| 2003/0110397 | A1 | 6/2003 | Supramaniam et al. |
| 2003/0135759 | A1 | 7/2003 | Kim et al. |
| 2004/0123188 | A1 | 6/2004 | Srinivasan et al. |
| 2004/0181690 | A1 | 9/2004 | Rothermel et al. |
| 2004/0220947 | A1 | 11/2004 | Aman et al. |
| 2004/0225877 | A1 | 11/2004 | Huang |
| 2005/0022018 | A1 | 1/2005 | Szor |
| 2005/0125685 | A1 | 6/2005 | Samuelsson et al. |
| 2005/0240990 | A1 | 10/2005 | Trutner et al. |
| 2005/0246522 | A1 | 11/2005 | Samuelsson et al. |
| 2005/0273856 | A1* | 12/2005 | Huddleston .................. 726/22 |
| 2006/0005227 | A1 | 1/2006 | Samuelsson et al. |
| 2006/0021002 | A1 | 1/2006 | Townsend et al. |
| 2006/0048209 | A1 | 3/2006 | Shelest et al. |
| 2006/0174318 | A1 | 8/2006 | Shelest et al. |
| 2006/0282876 | A1 | 12/2006 | Shelest et al. |

OTHER PUBLICATIONS

Moore, B. et al., "Policy Core Information Model—Version 1 Specification (RFC 3060)," Feb. 2001, Network Group, Version 1.

Beres, Yolanta and Chris I. Dalton, "Dynamic Label Binding at Run-time," New Security Paradigms Workshop 2003 Ascona Switzerland, ACM 2004.

Jajodia, S. et al., "A Unified Framework for Enforcing Multiple Access Control Policies," SIGMOD '97 Arizona, ACM 1997.

Sirer, E. And Ke Wang, "An Access Control Language for Web Services," SACMAT '02 Monterey, California, ACM 2002.

Zhang et al., "An agent based architecture for supporting application level security," DARPA Information Survivability Conference and Exposition, 2000, DISCEX'00 Proceedings, vol. 1, Jan. 25-27, 2000, pages 187-198.

* cited by examiner

| signature 0 | signature 1 | ... | signature M | ... | signature N |
|---|---|---|---|---|---| specification vendor 0 — 203

| signature 0 | signature 1 | ... | signature M | ... | signature N |
|---|---|---|---|---|---| signature file vendor 0 version 1 — 202

| signature 0 | signature 1 | ... | signature M |
|---|---|---|---| signature file vendor 0 version 0 — 201

*FIG. 2*

METHOD AND SYSTEM FOR SEPARATING RULES OF A SECURITY POLICY FROM DETECTION CRITERIA

TECHNICAL FIELD

The described technology relates generally to developing and distributing security policies.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of software systems including application programs or other computer programs executing on those computer systems. Developers of software systems and administrators of computer systems of an enterprise go to great effort and expense to identify and remove vulnerabilities. Because of the complexity of software systems, however, it is virtually impossible to identify and remove all vulnerabilities before software systems are released. After a software system is released, developers can become aware of vulnerabilities in various ways. A party with no malicious intent may identify a vulnerability and may secretly notify the developer so the vulnerability can be removed before a hacker identifies and exploits it. If a hacker identifies a vulnerability first, the developer may not learn of the vulnerability until it is exploited—sometimes with disastrous consequences.

Regardless of how a developer finds out about a vulnerability, the developer typically develops and distributes to system administrators "patches" or updates to the software system that remove the vulnerability. If the vulnerability has not yet been exploited (e.g., might not be known to hackers), then a developer can design, implement, test, and distribute a patch in a disciplined way. If the vulnerability has already been widely exposed, then the developer may rush to distribute a patch without the same care that is used under normal circumstances. When patches are distributed to the administrators of the computer systems, they are responsible for scheduling and installing the patches to remove the vulnerabilities.

Unfortunately, administrators often delay the installation of patches to remove vulnerabilities for various reasons. When a patch is installed, the software system and possibly the computer system on which it is executing may need to be shut down and restarted. If the vulnerability is in a software system that is critical to the success of an enterprise, then the administrator needs to analyze the tradeoffs of keeping the software system up and running with its associated risk of being attacked and of shutting down a critical resource of the enterprise to install the patch. Some administrators may delay the installation of the patch because they fear that, because of a hasty distribution, it might not be properly tested and have unintended side effects. If the patch has an unintended side effect, then the software system, the computer system, or some other software component that is impacted by the patch may be shut down by the patch itself. Administrators need to factor in the possibility of an unintended side effect when deciding whether to install a patch. These administrators may delay installing a patch until experience by others indicates that there are no serious unintended side effects.

Intrusion detection systems have been developed that can be used to identify whether an attempt is being made to exploit a known vulnerability that has not yet been patched. These intrusion detection systems can be used to prevent exploitations of newly discovered vulnerabilities for which patches have not yet been developed or installed. These intrusion detection systems may define a "signature" for each way a vulnerability can be exploited. For example, if a vulnerability can be exploited by sending a certain type of message with a certain attribute, then the signature for that exploitation would specify that type and attribute. When a security enforcement event occurs, such as the receipt of a message, the intrusion detection system checks its signatures to determine whether any match the security enforcement event. If so, the intrusion detection and/or prevention system may take action to prevent the exploitation, such as dropping the message.

The collection of signatures for an enterprise forms the security policy of that enterprise. A security policy is typically expressed as rules that each have a condition indicating when the rule is satisfied and one or more actions to be performed when the rule is satisfied. The condition of a rule may include signatures or other detection criteria.

Security policies are typically distributed by the developers of the security policies to the administrators of enterprises for implementation on the computer systems of the enterprises. The administrators may have the flexibility to customize the security policies according to the needs of the enterprises. For example, a rule of a security policy may indicate to block a user's access to sports-related web sites. If, however, the enterprise is engaged in a sports-related industry, the administrator may want to disable that rule. After customizing the security policy, the administrator distributes the custom security policy to the computer systems of the enterprise. An administrator may be allowed to customize a security policy by modifying parameters of a detection criterion (e.g., remove a web site that should not be classified as sports-related) or the actions of a rule. In addition, an administrator may be allowed to add new rules. The security policy that is distributed to computer systems of an enterprise is the security policy of the developer as customized by the administrator.

Several difficulties are encountered when customizing and distributing security policies. First, when the developer releases an updated version of a security policy, the administrator would need to again modify the updated version to implement the customizations. Modifying security policies can be a time-consuming and error-prone process. Second, the delay between release of the updated version and distribution to computer systems of the enterprise resulting from modification of the security policy means that the computer systems may be subject to exploitation of vulnerabilities during the delay that the updated version is designed to prevent. It would be desirable to have a technique for customizing and distributing security policies that overcome one or more of these or other difficulties.

SUMMARY

A method and system that enables a security policy to separate developer-provided detection criteria from an administrator-provided custom policy is provided. The security system allows a developer of detection criteria to provide a signature file containing the signatures that are available for use by a security policy. The security system also allows an administrator of a computer system to specify a custom policy that uses the signatures of the signature file. The developer may distribute the signature file to host computer systems independently of the administrator's distribution of the rules of the custom policy to the host computer systems. When a security enforcement event occurs at the host computer system, the security system applies the rules of the security policy to the event.

BRIEF DESCRIPTION OF THE DRAWINGS

FIG. 2 is a block diagram illustrating signature files and signature specifications in one embodiment.

DETAILED DESCRIPTION

Figure 1:
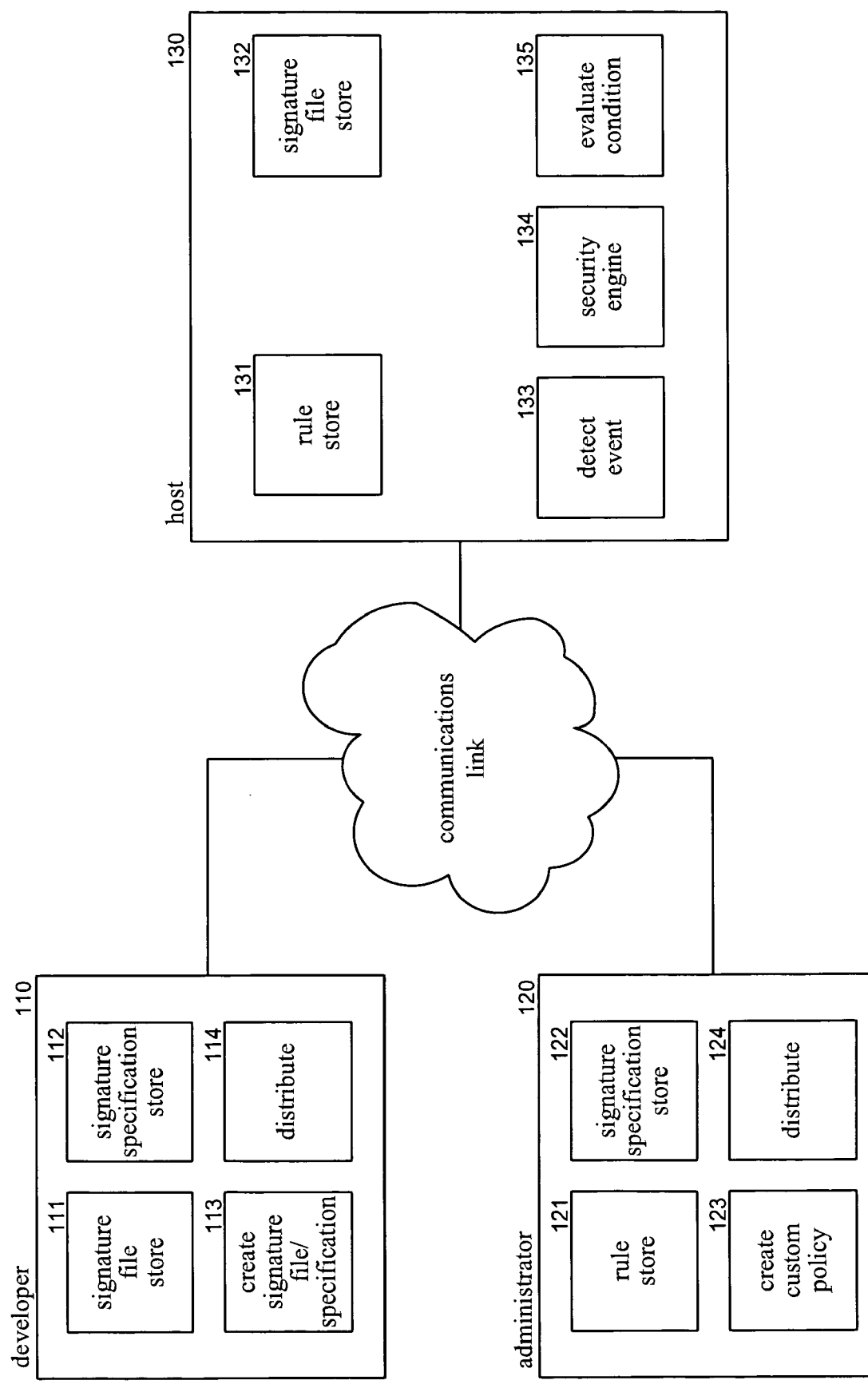
FIG. 1 is a block diagram illustrating components of the security system in one embodiment.

A method and system that enables a security policy to separate developer-provided detection criteria from an administrator-provided custom policy is provided. The security policy may define any type of behavior that is to be prevented. For example, an enterprise may want to prevent users from accessing certain web sites, a host computer system from opening too many TCP connections, a program from passing a certain parameter value to an operating system call, and so on. In one embodiment, the security system allows a developer of detection criteria to provide a signature file containing the signatures that are available for use by a security policy. For example, one signature may detect when a program is attempting to access a sports-related web site, and another signature may detect when a program is attempting to establish too many TCP connections. A developer-provided security policy may provide signatures along with default actions to take (e.g., block a request) when a signature is satisfied. Thus, a signature may define an implied rule with the signature as the condition and with the default action. The security system also allows an administrator of a computer system (e.g., the computer network of an enterprise) to specify a custom policy that uses the signatures of the signature file. For example, the administrator may specify a rule of the custom policy that indicates that, when users in a certain class attempt to access a sports-related web site as defined by the signature provided by the developer, the access should be blocked. The administrator may identify a signature in a rule by a developer-defined name and version. The developer may distribute the signature file to host computer systems independently of the administrator's distribution of the rules of the custom policy to the host computer systems. When a security enforcement event occurs at the host computer system (e.g., accessing a web site access request), the security system applies the rules of the security policy (i.e., provided with the signature file or custom policy) to the event. The security system applies the rules by evaluating the signatures of the signature file as specified by each rule. Because the signatures and the rules of the custom policy are separate, the developer can distribute a replacement for an existing signature file or distribute a new version of a signature file without the custom policy needing to be modified. When the rules of the custom policy are enforced, the security system may use the signatures of the most recent version. The developer may assure administrators that signatures with the same name will have the same semantics from version to version, although the implementations of the signatures may be different. For example, when a developer releases a new version of a signature file with a new implementation of the signature that detects accesses to sports-related web sites, the security system may automatically use the new implementation of the signature when enforcing the rules without having to modify the custom policy. In this way, signatures and custom policies can be developed and distributed independently by independent entities.

In one embodiment, a security policy includes rules that specify conditions, actions, and optionally exceptions. For example, a rule may indicate that an application may not receive messages on any network port other than port 80. The condition of the rule may be satisfied when a message is received on a network port other than port 80, and the action may result in the message being discarded. As another example, a rule may indicate that when an application attempts to send a message on network port 80, authorization is to be solicited from a user of the computing system on which the rule is enforced. The rules may be categorized into rule or security types based on their behavior. For example, rules with a network security type may be directed to security enforcement for network traffic. Each security type may have its own security component for enforcing rules of that security type. Languages for specifying security policies are described in U.S. patent application Ser. No. 10/882,438, entitled "Languages for Expressing Security Policies" and filed on Jul. 1, 2004, which is hereby incorporated by reference.

The condition, action, and exception of the rules may be specified as expressions. A rule may be semantically expressed as "IF conditions THEN actions EXCEPT exceptions." Conditions of a rule are expressions of circumstances under which security enforcement actions of the rule are to be performed. An action is an expression of activity to be performed when the condition is satisfied. A rule may have multiple actions. An exception is an expression of when the actions may not be performed even though the condition is satisfied. A condition may be either static or dynamic. A static condition is one which refers, for example, to a hard-coded list of files. A dynamic condition is one which, for example, performs a query to determine a list of files matching a provided criterion. Security enforcement actions may include allowing a request that caused the security enforcement event, denying the request, soliciting input from a user, notifying the user, and so on. Other rule constructs are also possible. As an example, an "else" construct could be added to perform alternate actions when a condition is false.

In one embodiment, the security system allows an administrator to identify a signature by name and by a version. The version may be identified either implicitly or explicitly. When a version is implicit, the security system may use the most recent version of the signature of that name. When a version is explicit, the security system may only use that version of the signature with that name. If a signature with that name or with an explicit version is not available at a host computer system, then the security system ignores the rules that specify that signature. An administrator can take advantage of the ignoring of rules to define rules prior to when the signatures that they specify become available. The administrator can define and distribute these rules to host computer systems. When a host computer system later receives the signature or specified version, the security system can start enforcing the rules that specify that signature version.

In one embodiment, the security system may allow the authenticity of a signature file to be verified. A developer of the signature file may encrypt a signature file using, for example, a private key of the developer. When the security system enforces rules that use the signature file, the security system can decrypt the signature file using the public key of the developer. If the decryption is successful, then the security system may assume that the signature file is from that developer and contains the content provided by that developer. In this way, the security system can reduce the chances that a signature file that has been tampered with is used. A signature file that can be authenticated may have the developer's assurance that the signatures will function correctly and that the signatures of that file will not interfere with one another when used in a security policy.

In one embodiment, the security system may allow a rule to specify a class of signatures to which the rule applies. For example, if the developer uses a certain naming convention for signatures, an administrator may use wild-card type characters to specify a group of signatures. Alternatively, the developer may categorize the rules (e.g., a TCP-related rule) so that an administrator can specify a category in the condition of rules. When the security system encounters a rule that specifies a group of signatures, the security system may evaluate each signature of the group and, if any one is satisfied, perform the action of the rule.

In one embodiment, the security system may allow an administrator to specify that a certain version of a signature is to be disabled. For example, if the administrator determines that the signature for sports-related web sites in a recently released version of the signature file incorrectly includes some non-sports-related web sites, the administrator may indicate that that version of the signature should be ignored. When the security system encounters a rule of the custom policy that specifies that signature, the security system ignores the rule. After the developer releases a new version of the signature file and the security system encounters a rule that specifies that signature, the security system enforces the rule because it is not the version that the administrator indicated to ignore. In this way, the security system can automatically start using the updated signature as soon as it is released without the administrator having to modify the custom policy.

FIG. 1 is a block diagram illustrating components of the security system in one embodiment. The security system includes a developer computer system 110, an administrator computer system 120, and a host computer system 130. One skilled in the art would appreciate that there may be multiple developer, administrator, and host computer systems. The developer computer system, the administrator computer system, and the host computer system communicate via communications link 140.

The developer computer system includes a signature file store 111, a signature specification store 112, a create signature file/specification component 113, and a distribute component 114. The create signature file/specification component is used by the developer to create the signature files and their specifications. The specification of a signature describes the semantics of the signature, which the developer may not change from version to version. In this way, an administrator can be assured that a rule that specifies the most recent version of the signature will work correctly with subsequent versions of the signature (assuming no bug in the implementation of the signature). In other words, the implementation of the signature may change from version to version, but its semantics will not. The administrator may use the signature specifications when developing the rules for the custom policy. The signature file store contains the signatures defined by the developer, and the signature specification store contains the signature specifications defined by the developer. The distribute component is used to distribute the signature files and signature specifications to the administrator and host computer systems.

The administrator computer system includes a rule store 121, a signature specification store 122, a create custom policy component 123, and a distribute component 124. The administrator uses the create custom policy component to define the rules of a custom policy. The rules of the custom policy are stored in the rule store. The administrator may use the signature specifications of the signature specification store to define the rules. The signature specifications have been distributed to the administrator computer system by the developer computer system. The administrator computer system may also include a signature file store provided by the developer so that the custom policies can be tested by the administrator. The distribute component distributes the custom policies to the host computer systems.

The host computer system includes a rule store 131, a signature file store 132, a detect event component 133, a security engine 134, and an evaluate condition component 135. The rule store contains the rules of the custom policy provided by the administrator computer system. The signature file store contains the signature files provided by the developer computer system. The developer and the administrator may distribute a signature file and a custom policy that uses that signature file to the host computer system independently. For example, the host computer system may receive a signature file before any corresponding update to the custom policy based on that signature file is received. In that case, the security system at the host computer system will apply the custom policy using the signatures of the new signature file as the most recent version. The detect event component determines when a security enforcement event occurs and passes an indication of that event to the security engine. The security engine applies each rule of the rule store to the security event to determine whether its condition is satisfied. The security engine determines whether a condition of a rule is satisfied by invoking the evaluate condition component. If a rule is satisfied, then the security engine performs the action of that rule. The evaluate condition component identifies the signatures specified in the rules and evaluates the appropriate signatures of the signature file store.

The computing device on which the security system is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

The security system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The host computer systems may be cell phones, personal digital assistants, smart phones, personal computers, programmable consumer electronics, digital cameras, and so on.

The security system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 2 is a block diagram illustrating signature files and signature specifications in one embodiment. Signature file 201 is version 0 provided by the vendor 0, and signature file 202 is version 1 provided by the vendor 0. Signature file 201 includes signatures 0 through M, and signature file 202 includes signatures 0 through N. When signature file 201 was released by the developer, specification 203 was released but may have only included specifications for signatures 0 through M. When signature file 202 was later released by the developer, it may have provided new implementations for signatures 0 through M, and it did provide new signatures M+1 through N. In addition, when signature file 202 was released, the developer may have released a new version of the specifications that included specifications M+1 through N. The developer may implement an authentication mechanism for the signature files so that the security system at a host computer system can ensure the authenticity of the signature file, that is, ensure that the signature file (or specification) is from a certain developer and has not been tampered with since it was released by the developer.

Figure 3:
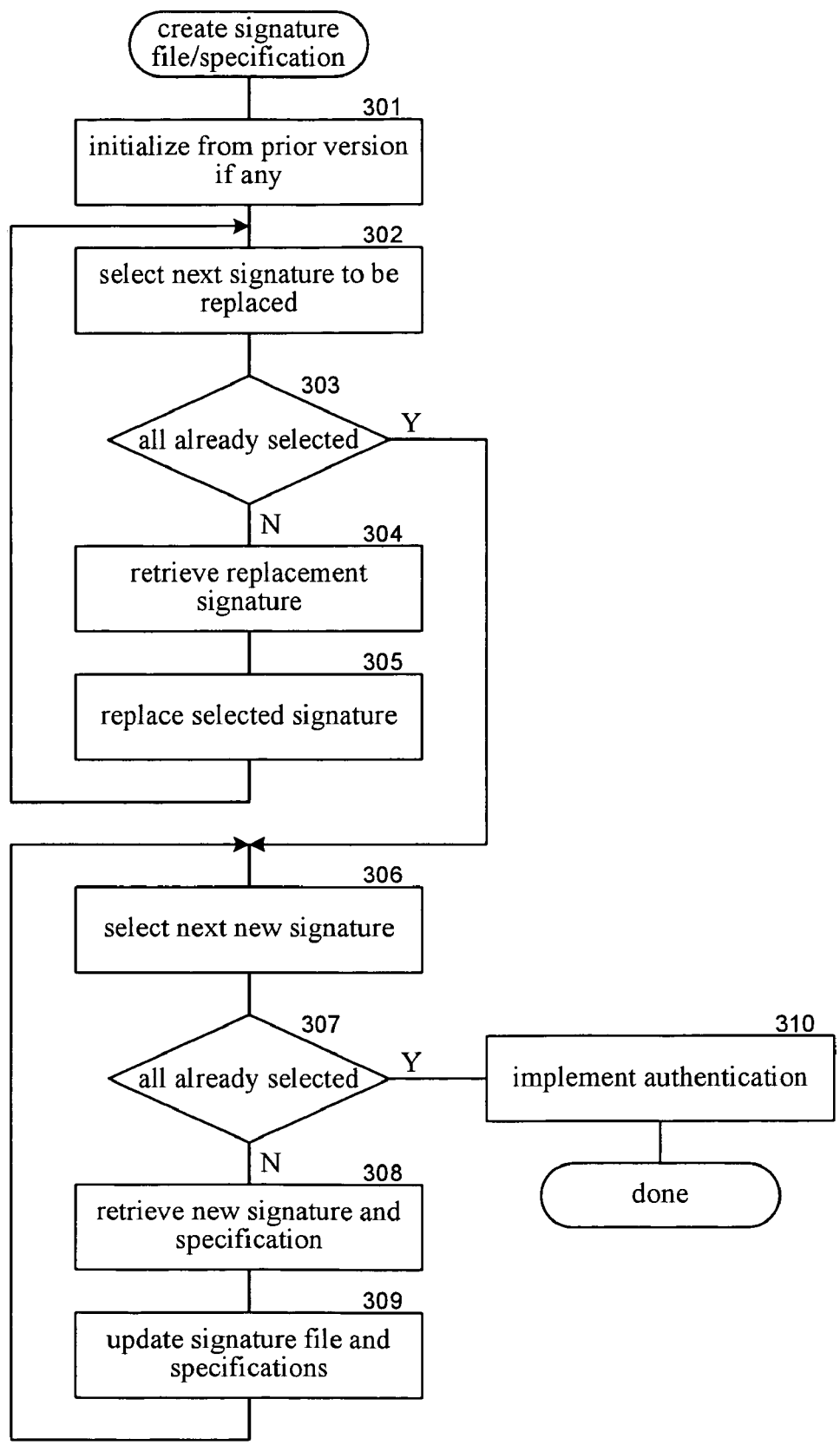
FIG. 3 is a flow diagram that illustrates the processing of the create signature file/specification component of the developer computer system in one embodiment.

FIG. 3 is a flow diagram that illustrates the processing of the create signature file/specification component of the developer computer system in one embodiment. The component allows a developer to define the signatures and their specifications. The component may provide a user interface through which the developer can specify the new versions of the signatures. In block 301, the component may initialize a new signature file from the prior version, if any. For example, signature file 202 may be initialized to the signatures of signature file 201. In blocks 302-305, the component loops allowing the developer to specify replacement signatures for the signatures of a prior version. In block 302, the component selects (e.g., based on developer input) the next signature of the prior version to be replaced. In decision block 303, if all such signatures have already been selected, then the component continues at block 306, else the component continues at block 304. In block 304, the component retrieves the replacement signature for the selected signature. In block 305, the component replaces the signature of the signature file with the replacement signature and then loops to block 302 to select the next signature. In blocks 306-309, the component loops adding the new signatures to the signature file. In block 306, the component selects the next new signature. In decision block 307, if all the new signatures have already been selected, then the component continues at block 310, else the component continues at block 308. In block 308, the component retrieves the new signature and its specification. In block 309, the component adds the new signature and specification to the signature file and signature specifications and then loops to block 306 to select the next new signature. In block 310, the component implements the authentication mechanism. For example, the component may encrypt the signature file and signature specifications with a private key of the developer.

Figure 4:
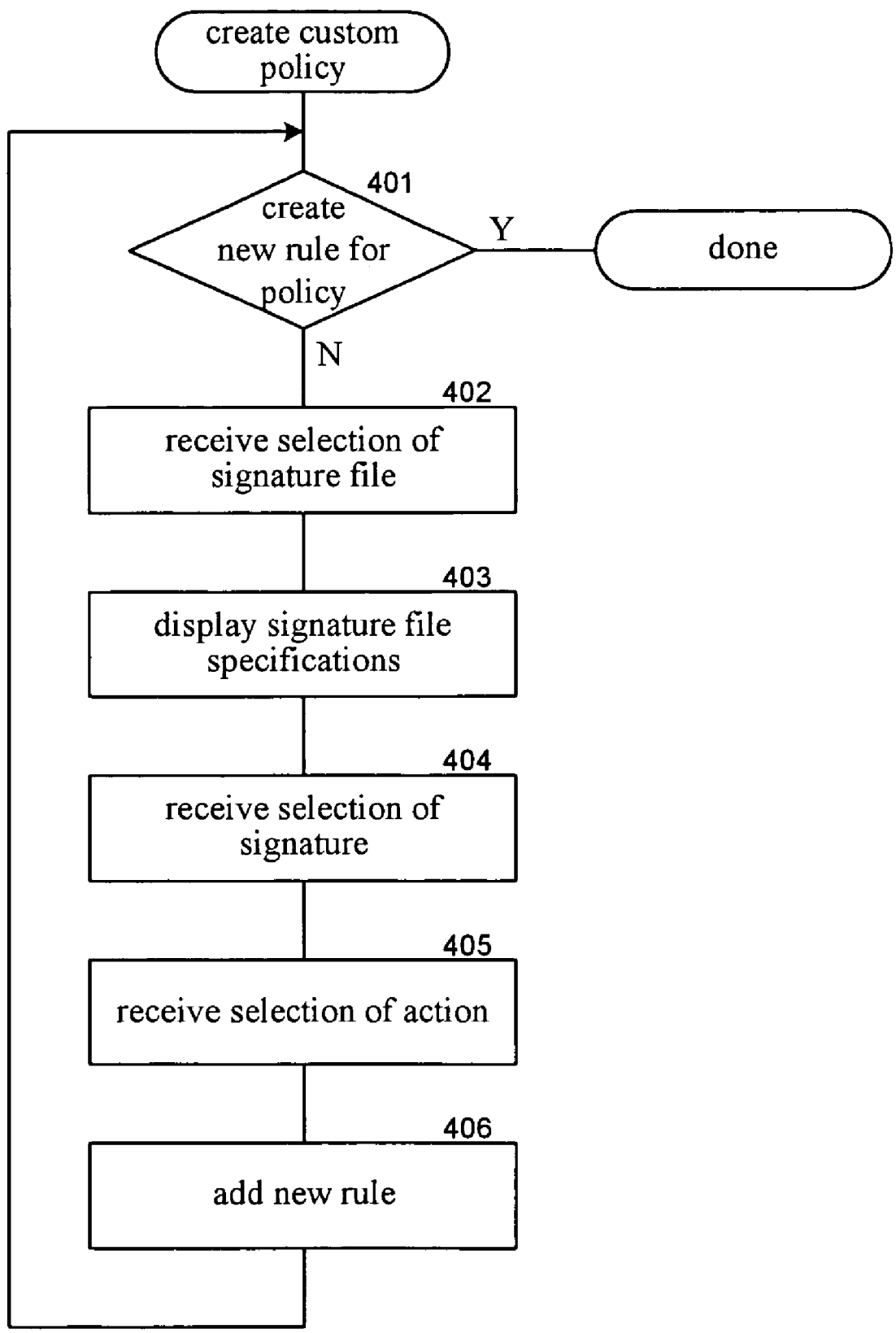
FIG. 4 is a flow diagram that illustrates the processing of the create custom policy component in one embodiment.

FIG. 4 is a flow diagram that illustrates the processing of the create custom policy component in one embodiment. The component may provide a user interface through which an administrator can define the rules of the custom policy. Alternatively, an administrator could define the rules in a document using XML or some other format. In decision block 401, if no more rules are to be created for the custom policy, then the component completes, else the component continues at block 402. In block 402, the component receives the selection of a signature file from an administrator. In block 403, the component displays the specifications of the signatures to the administrator. In block 404, the component receives a selection of a signature from an administrator. In block 405, the component receives a selection of an action from the administrator. In block 406, the component adds a rule to the custom policy indicating that when the selected signature is satisfied, the action is to be performed. One skilled in the art will appreciate that the condition of a rule may include Boolean combinations of multiple signatures. For example, a rule may be "if vendor 0. signature10 and vendor0.signature11.version5, then block." According to this rule, if the most recent version of signature10 is satisfied and the fifth version of signature11 is satisfied, then the condition is satisfied.

Figure 5:
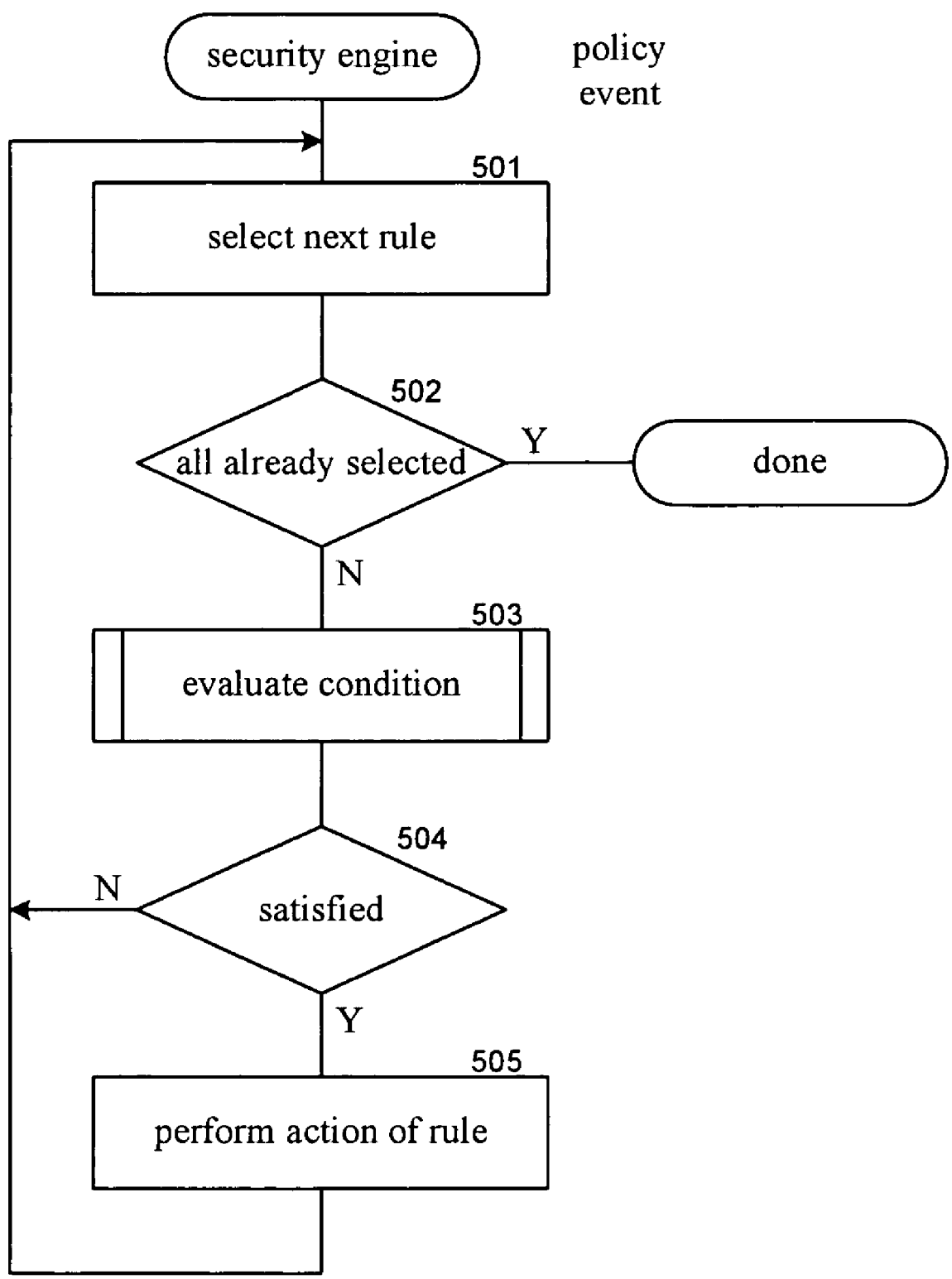
FIG. 5 is a flow diagram that illustrates the processing of the security engine at a host computer system in one embodiment.

FIG. 5 is a flow diagram that illustrates the processing of the security engine at a host computer system in one embodiment. The security engine is invoked when a security enforcement event is detected. The security engine is passed an indication of the event and the security policy. In blocks 501-505, the component loops determining whether each rule is satisfied. In block 501, the component selects the next rule of the custom policy. In decision block 502, if all the rules have already been selected, then the component completes, else the component continues at block 503. In block 503, the component invokes the evaluate condition component to evaluate the condition of the selected rule to determine whether it is satisfied. In decision block 504, if the condition is satisfied, then the component continues at block 505, else the component loops to block 501 to select the next rule. In block 505, the component performs the action of the rule and then loops to block 501 to select the next rule.

Figure 6:
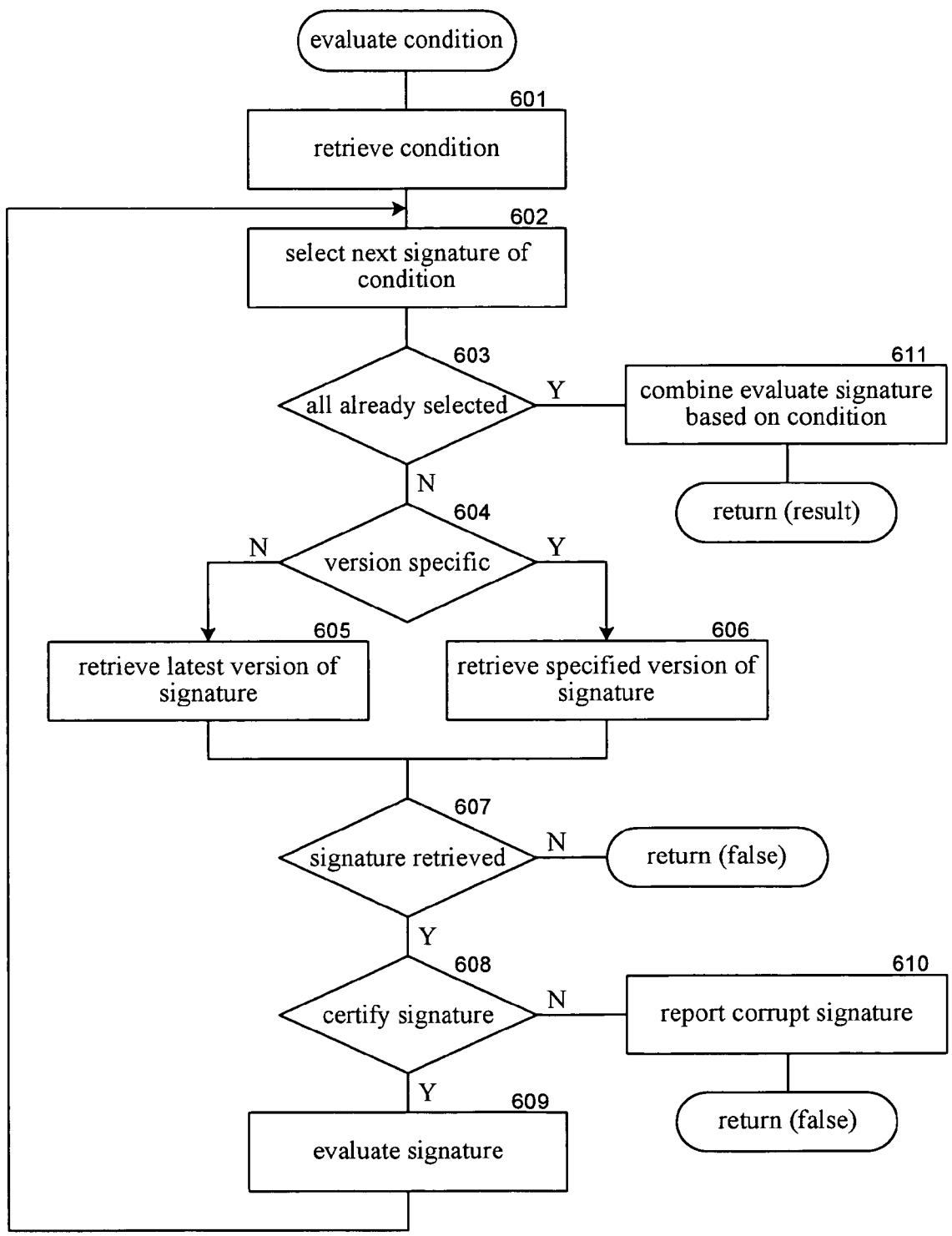
FIG. 6 is a flow diagram that illustrates the processing of the evaluate condition component of the host system in one embodiment.

FIG. 6 is a flow diagram that illustrates the processing of the evaluate condition component of the host computer system in one embodiment. The component is passed a condition and determines whether it is satisfied. In block 601, the component retrieves the condition. In blocks 602-609, the component loops evaluating each signature of the condition. As described above, a condition may have multiple signatures as operands of Boolean operators. In block 602, the component selects the next signature of the condition. In decision block 603, if all the signatures of the condition have already been selected, then the component continues at block 611, else the component continues at block 604. In decision block 604, if the specification of the signature indicates a specific version, then the component continues at block 606, else the component continues at block 605. In block 605, the component retrieves the version of the signature from the most recent signature file. In block 606, the component retrieves the version of the signature from the specified signature file. In decision block 607, if a signature was retrieved, then the component continues at block 608, else the component returns an indication of false because the appropriate signature could not be retrieved. In decision block 608, if the signature (or signature file) can be authenticated, then the component continues at block 609, else the component continues at block 610. In block 609, the component evaluates the selected signature and then loops to block 602 to select the next signature. In block 610, the component reports that a corrupt signature (or signature file) has been encountered and returns an indication of false. In block 611, the component evaluates the overall condition by combining the evaluated signatures based on the Boolean logic of the condition. The component then returns the result of that evaluation.

From the foregoing, it will be appreciated that specific embodiments of the security system have been described herein for purposes of illustration, but that various modifications may be made without deviating from the spirit and scope of the invention. As used herein, "detection criteria" refers to any technique for identifying an event that may lead to an exploitation of a vulnerability or any behavior that is to be prevented. For example, detection criteria may be based on profile-based intrusion detection, misuse detection, pattern matching, stateful pattern matching, protocol-based analysis, and heuristic-based analysis. Accordingly, the invention is not limited except as by the appended claims.

The invention claimed is:

1. A method in a computer system for enforcing a security policy, the method comprising:
   providing detection criteria available for the security policy, the detection criteria being provided by a developer and being developer signatures specifying how to detect an attempted exploitation of a vulnerability of a software system;
   providing developer rules of the security policy, the developer rules being developed by the developer, a developer rule specifying a condition and an action, the condition of a developer rule specifying a developer signature;
   defining by a user custom rules for the security policy, a custom rule specifying a condition and an action, the condition of a custom rule specifying a developer signature; and
   when a security event occurs,
      evaluating the conditions of the developer rules and the custom rules, the evaluating including evaluating the provided detection criterion specified by the rule; and
      when the evaluation of the condition indicates to perform the action, performing the action of the rule
   wherein the custom rules can take advantage of the detection criteria developed by the developer and the provided detection criteria can be modified by the developer and distributed to the user without having to modify previously defined custom rules.

2. The method of claim 1 wherein the signatures that are provided in a signature file.

3. The method of claim 2 wherein the signature file can be authenticated to be from a specific vendor.

4. The method of claim 3 wherein the signature file is encrypted.

5. The method of claim 2 wherein a signature file has a version and a rule specifies to use a signature of the most recent version.

6. The method of claim 2 wherein a signature file has a version and a rule specifies to use a signature from a specific version.

7. The method of claim 1 wherein when a condition of a rule specifies a detection criterion that is not currently available, disregarding the rule when enforcing the security policy.

8. The method of claim 1 wherein the developer is independent from the user that defines the custom rules of the security policy.

9. The method of claim 1 wherein a detection criterion has a version and a rule of a policy indicates to ignore a certain version of the detection criterion, but not to ignore subsequent versions.

10. The method of claim 1 wherein a condition of a rule specifies a group of detection criteria wherein the action of the rules is performed for all detection criteria in the group.

11. Computer-readable media for controlling computer systems to distribute a security policy, by a method comprising:
    receiving a first signature file containing signatures available for a security policy;
    distributing the first signature file to host computer systems;
    creating custom rules of a custom policy, a customer rule specifying a signature of the signature file for a condition and specifying an action to be performed when the condition is satisfied;
    distributing the custom rules of the custom policy to the host computer systems;
    after distributing the custom rules,
       receiving a second signature file containing signatures available for the security policy; and
       distributing the second signature file to the host computer systems,
    wherein the host computer systems enforce the custom policy using the signatures of the first signature file before receiving the second signature file and of the second signature file after receiving the second signature file without having to modify the custom security policy.

12. The computer-readable media of claim 11 wherein the signature file can be authenticated to be unmodified and provided by a specific vendor.

13. The computer-readable media of claim 11 wherein the signature file has a version and a rule specifies to use a signature of the latest version.

14. The computer-readable media of claim 11 wherein the signature file has a version and a rule specifies to use a signature from a specific version.

15. The computer-readable media of claim 11 wherein when a condition of a rule specifies a signature that is not currently available, disregarding the rule when enforcing the custom policy.

16. The computer-readable media of claim 11 wherein the signature file is provided by an entity that is independent from the entity that provides the rules of the custom policy.

17. The computer-readable media of claim 11 wherein a signature has a version and a custom policy indicates to ignore a certain version of the signature, but not to ignore subsequent versions.

18. The computer-readable media of claim 11 wherein a condition of a rule specifies a group of signatures wherein the action of the rule is performed based on the number of signatures that are satisfied.

19. A computer system for enforcing a security policy, comprising:
    means for receiving different versions of detection criteria available for the security policy, such that a designated detection criterion has a first version and a second version;
    means for creating rules of a custom policy, a designated rule specifying the designated detection criterion and the first version for a condition and specifying an action to be performed when the condition is satisfied; and
    means for enforcing the rules of the custom policy by evaluating the first version of the designated detection criterion of the security file specified by the designated rule
    such that the second and any later versions of the designated detection criterion are not used when the designated rule is enforced, but are available to be used when enforcing other rules of the security policy and the designated rule does not need to be modified after the second version of the designated detection criterion is received.

20. The computer system of claim 19 wherein when a condition does not explicitly specify a version, the means for enforcing uses the latest version.

* * * * *

UNITED STATES PATENT AND TRADEMARK OFFICE
CERTIFICATE OF CORRECTION

PATENT NO. : 7,591,010 B2
APPLICATION NO. : 11/039637
DATED : September 15, 2009
INVENTOR(S) : Shelest et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this

Twenty-first Day of September, 2010

David J. Kappos
*Director of the United States Patent and Trademark Office*